US007643080B2

(12) United States Patent
Abe et al.

(10) Patent No.: US 7,643,080 B2
(45) Date of Patent: Jan. 5, 2010

(54) IMAGE PICK-UP APPARATUS AND COMPUTER PROGRAM FOR SUCH APPARATUS

(75) Inventors: Yoshinori Abe, Akishima (JP); Kazunori Yanagi, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 502 days.

(21) Appl. No.: 11/342,418

(22) Filed: Jan. 30, 2006

(65) Prior Publication Data

US 2006/0170807 A1 Aug. 3, 2006

(30) Foreign Application Priority Data

Feb. 1, 2005 (JP) ............................ 2005-025537

(51) Int. Cl.
*H04N 5/222* (2006.01)
(52) U.S. Cl. ............................ 348/333.03; 348/333.05; 348/333.11
(58) Field of Classification Search .............. 348/207.2, 348/239, 333.03, 333.05, 333.12, 584, 211.3, 348/333.11; 345/620; 382/282; 358/1.2
See application file for complete search history.

(56) References Cited

U.S. PATENT DOCUMENTS

| | | | | |
|---|---|---|---|---|
| 6,621,524 B1* | 9/2003 | Iijima et al. | .................. | 348/584 |
| 6,999,113 B1* | 2/2006 | Omura | .................... | 348/207.2 |
| 7,321,393 B2* | 1/2008 | Kim | ...................... | 348/333.03 |
| 2001/0048447 A1* | 12/2001 | Jogo | .......................... | 345/620 |
| 2002/0085771 A1* | 7/2002 | Sakuramoto | ................ | 382/282 |
| 2004/0174434 A1* | 9/2004 | Walker et al. | ............ | 348/211.3 |
| 2005/0104988 A1* | 5/2005 | Su et al. | ................ | 348/333.12 |
| 2006/0033937 A1* | 2/2006 | Hwang | ...................... | 358/1.2 |

* cited by examiner

*Primary Examiner*—Lin Ye
*Assistant Examiner*—Dennis Hogue
(74) *Attorney, Agent, or Firm*—Frishauf, Holtz, Goodman & Chick, P.C.

(57) ABSTRACT

A second-frame is displayed while a through image is displayed for a reviewing purpose immediately after the photographing operation is performed. The user is allowed to combine an object image of ID photograph with the second-frame. The user obtains plural ID photograph sizes with respect to the previously set display language by operating SET key (at step S14). The ID photograph sizes are different from country to country. The user trims portions of an image of image data defined by the second-frame based on plural ID photograph sizes to produce plural trimmed-images (images of ID photograph of different sizes (at step S15). One layout image is produced using the plural trimmed-images based on a layout chosen by the user (at step S18), and is recorded (at step S19).

22 Claims, 9 Drawing Sheets

IMAGE PICK-UP APPARATUS AND COMPUTER PROGRAM FOR SUCH APPARATUS

BACKGROUND OF THE INVENTION

1. Field of the Invention

The present invention relates to an image pick-up apparatus and a computer program for such image pick-up apparatus, and more particularly, relates to an easy-to-use image pick-up apparatus and a computer program for such image pick-up apparatus, which allow the user to take ID photographs with a relatively simple operation.

2. Description of Related Art

In recent, image pick-up apparatus such as a digital camera, which has ID photograph mode for taking ID photographs and allows the user to taking various sorts of ID photographs with a relatively simple operation has become widely used.

SUMMARY OF THE INVENTION

According to one aspect of the invention, there is provided an image pick-up apparatus which comprises an image display unit for displaying an image, an image pick-up unit for performing an image pick-up operation to generate an image of an object, a first display control unit for displaying on the image display unit a frame together with a through image of the object generated by the image pick-up unit, a photography control unit for controlling the image pick-up operation to be performed by the image pick-up unit to obtain a photographed image of the object, and a second display control unit for displaying on the image display unit a frame together with the photographed image of the object obtained by the photography control unit.

Further, according to the other aspect of the invention, there is provided an image pick-up apparatus which comprises an image display unit for displaying an image an image data obtaining unit for obtaining image data, a display control unit for displaying on the image display unit a frame together with the image data obtained by the image data obtaining unit, a trimmed image producing unit for trimming several times portions of an image of the image data defined by the frame displayed on the image display unit to produce plural sorts of trimmed image data each having a different aspect ratio from the image data obtained by the image data obtaining unit, a recording unit for recording data, and a record control unit for recording the plural sorts of trimmed image data produced by the trimmed image producing unit on the recording unit.

According to still another aspect of the invention, there is provided a computer program for a computer to perform processes comprising an image pick-up process for generating an image of an object, a first display control process for displaying on an image display unit a frame together with a through image of the object generated in the image pick-up process, a photography control process for controlling the image pick-up process to photograph the object, obtaining photographed image data, and a second display control process for displaying on the image display unit a frame together with the photographed image data obtained in the photography control process.

DETAILED DESCRIPTION OF THE PREFERRED EMBODIMENTS

Now, embodiments of the present invention will be described in detail with reference to the accompanying drawings.

First Embodiment

A. Configuration of Digital Camera Apparatus

Figure 1:
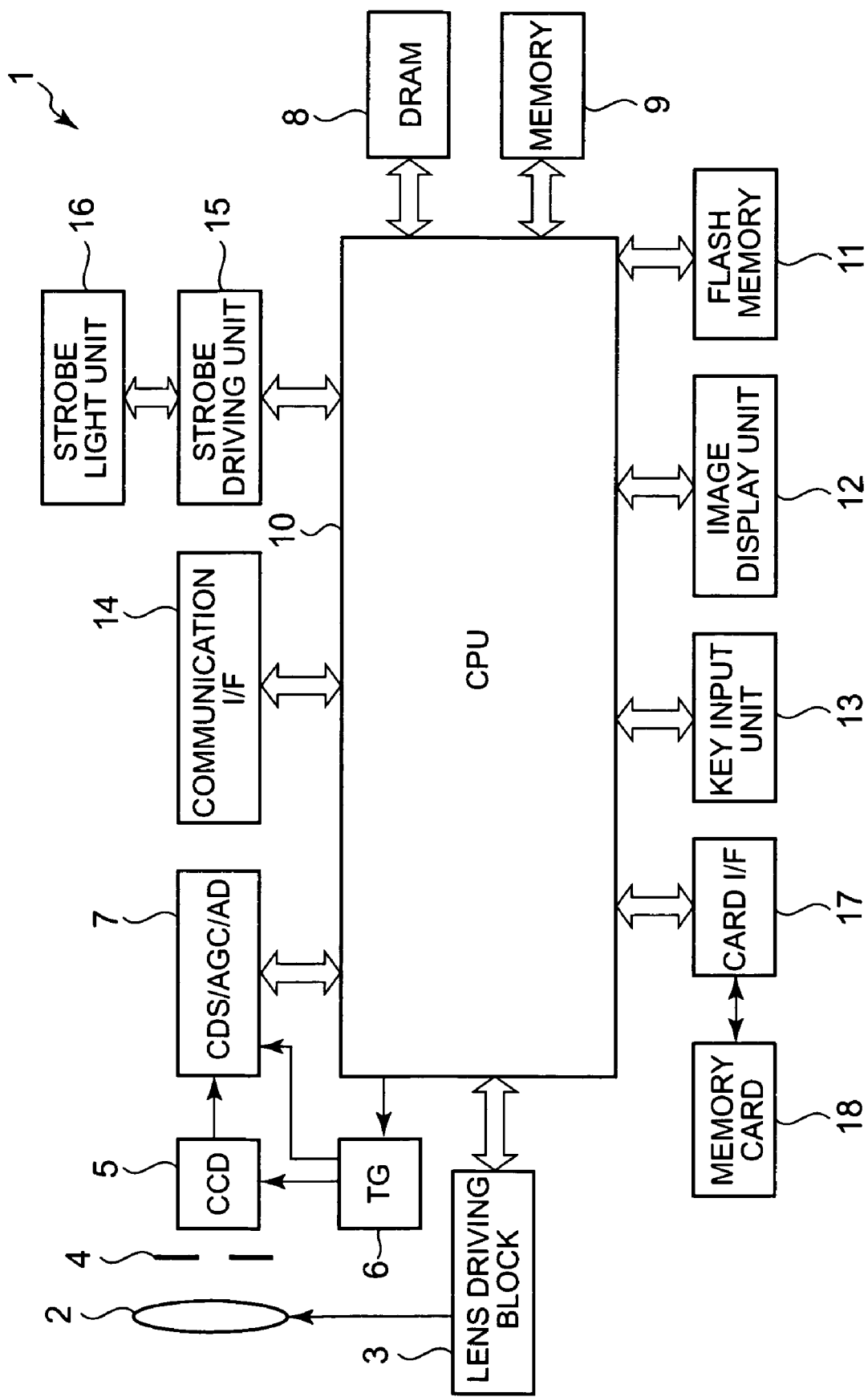
FIG. 1 is block diagram showing a circuit configuration of a digital camera apparatus according to embodiments of the invention.

FIG. 1 is a block diagram showing a circuit configuration of a digital camera apparatus 1, i.e. an image pick-up apparatus according to the present invention.

The digital camera apparatus 1 comprises an image pick-up lens 2, lens driving block 3, aperture/shutter mechanism 4, CCD 5, TG (Timing signal Generator) 6, unit circuit 7, DRAM 8, memory 9. CPU 10, flash memory 11, image display unit 12, key input unit 13, communication I/F 14, strobe driving unit 15, strobe light unit 16, and card I/F 17. The card I/F is to be connected with a memory card 18, which is detachably installed in a card slot provided in a body (not shown) of the digital camera apparatus 1.

The image pick-up lens 2 has focus lenses and zoom lenses (not shown), and is connected with the lens driving block 3. The lens driving block 3 comprises a focus motor and zoom motor for moving the focus lens and zoom lens along the optical axis, respectively, and a focus motor driver and zoom motor driver for driving the focus motor and zoom motor in accordance with control signals from CPU 10, respectively.

The aperture/shutter mechanism 4 has a driving circuit (not shown). The driving circuit makes the aperture/shutter mechanism 4 operate in accordance with a control signal from CPU 10.

The aperture is referred to a mechanism or lens diaphragm opening which regulates amount of light passing through the image pick-up lens 2 onto CCD 5, and the shutter is referred to a mechanism which regulates a time admitting light passing through onto CCD 5. A time during which CCD 5 receives light thereon is regulated by a shutter open-close speed. Exposure can be determined by the aperture value and shutter speed.

CCD (image pick-up unit) 5 transforms an image of an object projected thereon through the image pick-up lens 2 and aperture/shutter mechanism 4 into an electric signal, and outputs the electric signal, i.e. a photographed image signal to the unit circuit 7. CCD 5 is driven based on a timing signal of a certain frequency generated by TG 6. TG 6 is connected with the unit circuit 7.

The unit circuit 7 includes CDS (Correlated Double Sampling) circuit, which executes a correlated double sampling process on the photographed image signal output from CCD 5, AGC (Automatic Gain Control) circuit, which amplifies the sampled photographed image signal to a regulated level, and A/D converter, which converts the analog photographed image signal supplied from AGC circuit into a digital signal. The photographed image signal output from CCD5 is converted into a digital signal by the unit circuit 7.

CPU 10 consists of one-chip micro-computer which controls operation of various units in the digital camera apparatus 1, and has functions of executing image processes, including a pixel interpolation process, gamma correction, generation of a luminance signal and color difference signals, white balance adjustment, and exposure compensation, on image data supplied from the unit circuit 7, and functions of image-data compensation and expansion (for example, compensation/expansion of data in conformity of JPEG format and MPEG format).

DRAM 8 is used as a buffer memory for temporarily storing image data output from CCD 5 and transferred to CPU 10, and also used as a work memory of CPU 10. DRAM 8 serves as a storing unit of the invention.

The flash memory 11 and memory card 18 serve as recording media, on which image data obtained by CCD 5 are stored. The present embodiment using only the flash memory 11 for writing (storing) image data is described, but the user of the digital camera apparatus 1 is allowed to select the flash memory 11 or memory card 18 by operating the key input unit 13 to store image data. The flash memory 11 and memory card 18 serve as a recording unit of the camera apparatus 1 according to the present.

The image display unit 12 comprises a color liquid crystal display (LCD) and its driving circuit. In a photography standby state, the image display unit 12 displays a through image of an object obtained by means of CCD 5, and when a recoded image is reproduced, the image display unit 12 displays an image which is read out from the flash memory 11 or memory card 18 and expanded. This image display unit 12 serves as a display unit of the present invention.

The key input unit 13 includes various operation keys such as a shutter button, zoom key (including Tele key and Wide key), SET key, cross key and the like. The key input unit 13 supplies CPU 10 with an operation signal corresponding to user's operation to, and serves as a selecting unit and photography instruction unit.

The communication I/F 14 comprises a slot for receiving USB connector and the like, and is connected with a printer to transfer photographed image data.

The strobe driving unit 15 drives the strobe light unit 16 in accordance with a control signal from CPU 10 to make same emit flash light. CPU 10 judges on the basis of observed data obtained by a photometer circuit (not shown), whether an object to be photographed is in dark. When it is determined that a dark scene is to be photographed (or when the shutter button is to be pressed), CPU 10 sends the control signal to the strobe driving unit 15.

Memory 9 is a computer-readable storage medium on which is recorded a computer program necessary for CPU 10 to control various units in the digital camera apparatus 1 and data (first-frame, second-frame and the like) used to control the various units. CPU 10 performs various processes in accordance with the computer program to serve as an image pick-up unit, photographing control unit, first display control unit, second display control unit, frame adjusting unit, electronic zoom control unit, recording unit, and obtaining unit.

Information including data indicating sizes of an identification photograph (ID photograph) for various languages is stored on the memory 9. The sizes of ID photograph are different from country to country. For example, in case of Japanese ID photograph, data of ID photograph sizes, such as 50×40 mm, 45×35 mm, 40×30 mm, and 30×24 mm is stored.

Further, data of printing sizes is stored on the memory 9 for each language. For example, a post card size, i.e. 150×100 mm is employed for the printing size of Japanese ID photograph.

Information about plural layouts is also stored on the memory 9. More specifically, the information includes layout information (1) on a layout of ID photographs each having a different size to be disposed on a portrait oriented sheet, layout information (2) on a layout of ID photographs each having a different size to be disposed on a landscape oriented sheet, and layout information (3) on a layout of two ID photographs having a size and other two ID photographs having another size to be disposed on a landscape oriented sheet. The memory 9 serves as a frame information storing unit of the present invention.

B. Operation of the Digital Camera Apparatus 1

Figure 2:
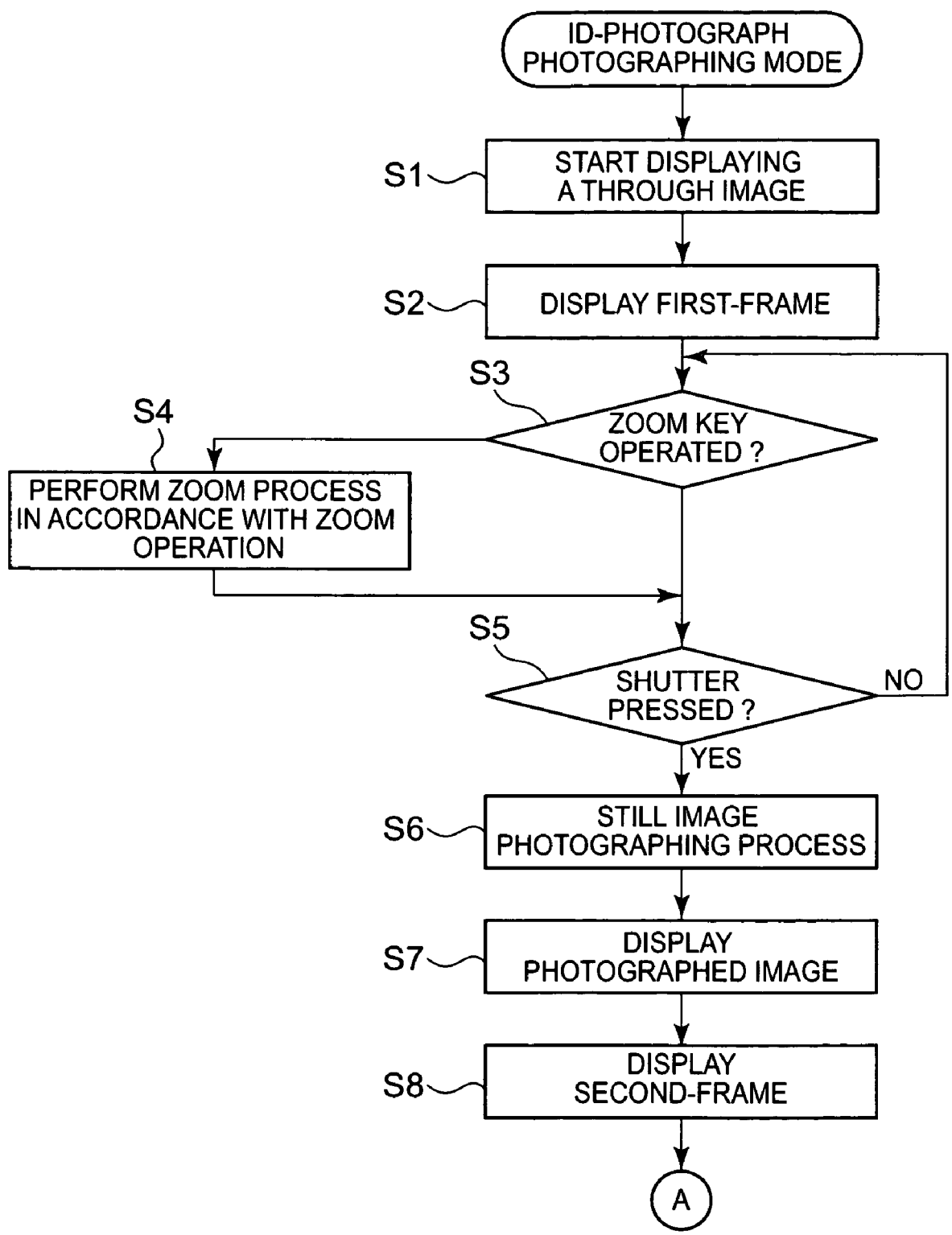
FIG. 2 is a flow chart of operation of the digital camera apparatus according to the first embodiment of the invention.

Operation of the digital camera apparatus 1 according to the first embodiment of the invention will be described with reference to flow charts shown in FIGS. 2 and 3.

First, when the user sets ID-photograph photographing mode by operating the key input unit 13, CPU 10 makes CCD 5 start operation of photographing an object, performs an imaging process on image data obtained by CCD5, and stores the processed image data on the buffer memory (DRAM 8). CCD 10 reads out the image data stored on the buffer memory to display an image of the object on the image display unit 12, whereby a through image of the object is displayed on the image display unit 12 at step S1 in FIG. 2.

Figure 4A:
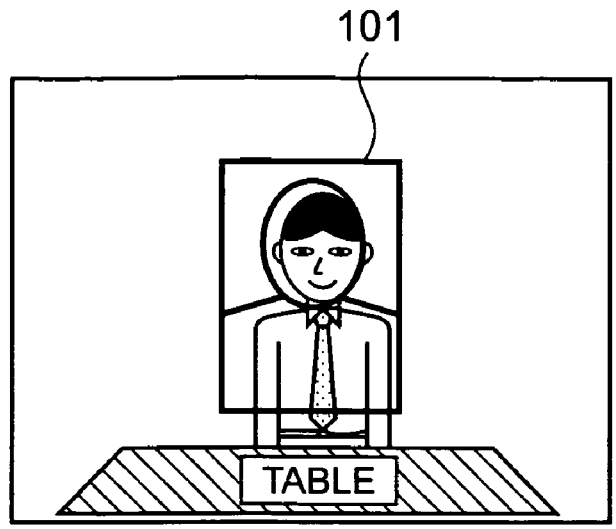
FIGS. 4A to 4C are views each showing an object image and a frame displayed on an image display unit 12.

Then, CPU 10 reads out the first-frame data from the memory 9 and displays the first-frame approximately at the center of the image display unit 12 at step S2. The first-frame is used only when the through image of the object is displayed on the image display unit 12, FIG. 4A is a view illustrating an image (image of the object with the first-frame) displayed on the image display unit 12. As illustrated in FIG. 4A, an image of a young man sitting at a table, photographed by CCD 5 is displayed together with the first-frame 101 on the image display unit 12. The first-frame comprises an oval frame corresponding to a face of the person, shoulder lines, and a frame surrounding the oval frame and shoulder lines.

CPU 10 judges at step S3 whether the user has operated the zoom key or not. CPU 10 makes judgment depending on whether or not an operation signal corresponding to operation of the zoom key has been sent from the key input unit 13. There are two zoom technologies, one by optically and other by electronically, for zooming in the object.

When it is determined that the zoom key has been operated (YES at step S3), CPU 10 executes a zooming process at step S4, and advances to step S5. When the optical zooming operation is executed, the zoom lens is driven to zoom in the object, and further when the electronic zooming operation is performed, CPU 10 trims image data obtained by CCD 5 to zoom in the object in a digital manner.

Meanwhile, when it is determined at step S3 that the zoom key has not yet been operated, CPU 10 advances directly to step S5.

At step S5, CPU 10 judges whether the user has pressed the shutter button or not. The judgment is made depending on whether or not an operation signal corresponding to operation of the shutter button has been sent from the key input unit 13.

When it is determined at step S5 that the user has not yet pressed the shutter button, CPU 10 returns to step S3. When it is determined at step S5 that the user has pressed the shutter button, CPU 10 advances to step S6.

During the loop of the processes from step S3 to step S5, the user is allowed to roughly match the object image to be photographed for ID photograph with the first-frame 101 by operating the zoom key and/or adjusting the position of the frame image.

For example, when the object image for ID photograph is smaller than the first-frame 101, the photographer can take a larger picture of the object (person) by zooming in the object or coming close to the object, or by asking the person (the object) to come close to the photographer. When the object image to be photographed is shifted aside from the first-frame 101, the photographer can adjust the position of the object image so as to match with the first-frame by moving aside or moving the object aside.

When it is determined at step S5 that the shutter button has been pressed, CPU 10 executes a still image photographing process, effecting an imaging process on the obtained image data, and stores the processed image data on the buffer memory at step S6. When a digital zooming operation is performed on the through image which is kept displayed on the image display unit 12, a trimming process and pixel interpolation process are effected on the image data and trimmed-image data is stored on the buffer memory.

In this case, it is assumed that the user has pressed the shutter button with both the object image and first-frame 101 displayed on the image display unit 12, as illustrated in FIG. 4A.

Then, CPU 10 reads out the photographed image data from the buffer memory and displays it on the image display unit 12 for a pre-viewing purpose at step S7.

Further, CPU 10 reads out the second-frame, which has been stored on the memory 9 to be displayed immediately after the image of the object is photographed, and displays the read out second-frame on the image display unit 12 at step S8.

Figure 4B:
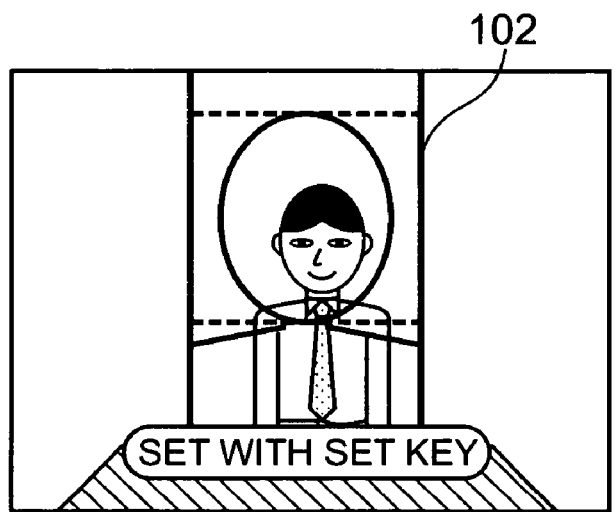

FIG. 4B is a view illustrating an image of photographed image data obtained by a photographing process, combined with the second-frame 102, both displayed on the image display unit 12. The second-frame 102 consists of parts corresponding respectively to his or her face (oval frame), neck, and shoulder parts of the person, and a frame surrounding these parts. The second-frame 102 is larger than the first-frame 101, and represents more detailed parts of an object to be photographed, whereby the user is allowed to fine adjust the object image to be photographed for ID photograph.

Figure 3:
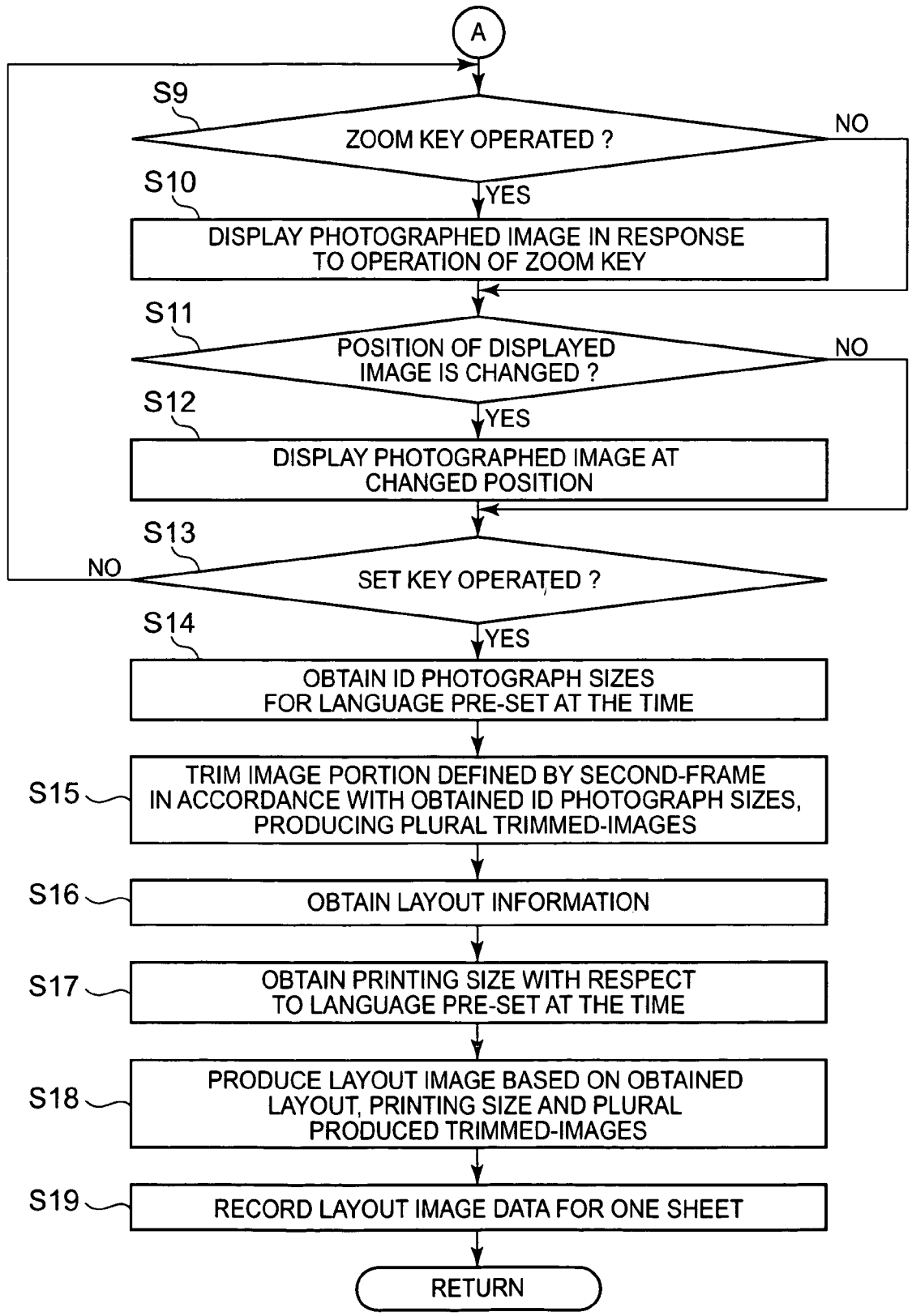
FIG. 3 is a flow chart of operation of the digital camera apparatus according to the first embodiment of the invention.

CPU 10 judges at step S9 in FIG. 3, whether or not the user has operated the zoom key. The judgment is made depending on whether an operation signal corresponding to operation of the zoom key has been sent to CPU 10.

When it is determined at step S9 that the zoom key has been operated, CPU 10 enlarges the image of photographed image data (digital zoom operation) in response to the operation of the zoom key at step S10, and advances to step S11.

Figure 4C:
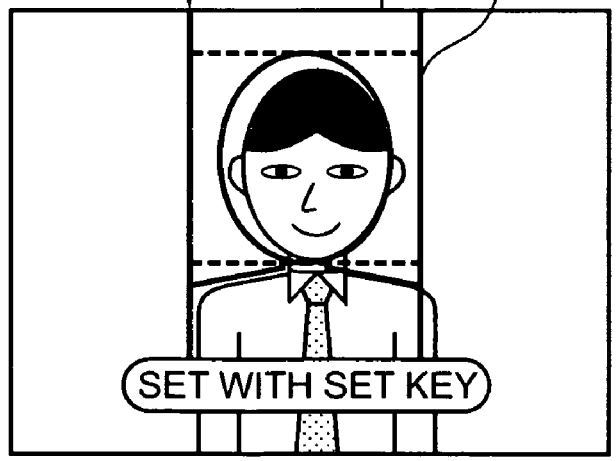

As the user operates the Tele key of the zoom key while the image of photographed image data is displayed on the image display unit 12 as illustrated in FIG. 4B, the image of photographed image data is enlarged by the digital zoom operation as illustrated in FIG. 4C. On the contrary, as the Wide key of the zoom key is operated by the user, the image of photographed image data returns to the size as illustrated in FIG. 4B, whereby the user is allowed to adjust the size of the object image such that the image of the object to be photographed for IC photograph comes to match with the second-frame 102.

Meanwhile, it is determined at step S9 that the zoom key has not yet been operated, CPU 10 advances directly to step S11.

At step S11, CPU 10 judges whether or not the user has operated to shift the position of the image of photographed image data to be displayed on the image display unit 12. The judgment is made depending on whether or not an operation signal corresponding to operation of the cross key of the key input unit 13 has been sent to CPU 10. When the operation signal is sent to CPU 10, then CPU 10 determines that operation has been performed to shift the position of the image.

When it is determined at step S11 that the operation has been performed to shift the position of the image of photographed image data to be displayed on the image display unit 12, CPU 10 changes or shifts the position of the displayed image in response to the operation of the cross key by the user (or in accordance with the operation signal sent from the key input unit 13), and displays the image of photographed image data at the changed or shifted position at step S12, and then advances to step S13.

More specifically, at this stage, the user can perform operation to change or shift the position of the image to be displayed on the image display unit 12. For example, as the user operates the cross key "↑" with the image displayed on the image display unit 12 as illustrated at (a) in FIG. 5, the image moves upward to a position on the image display unit 12 as illustrated at (b) in FIG. 5. On the contrary, as the user operates the cross key "↓" with the image displayed on the image display unit 12 as illustrated at (b) in FIG. 5, the image moves downward to a position on the image display unit 12 as illustrated at (a) in FIG. 5, and when the user further operates the cross key "↓", the image moves further downward to a position as illustrated at (c) in FIG. 5.

Figure 5:
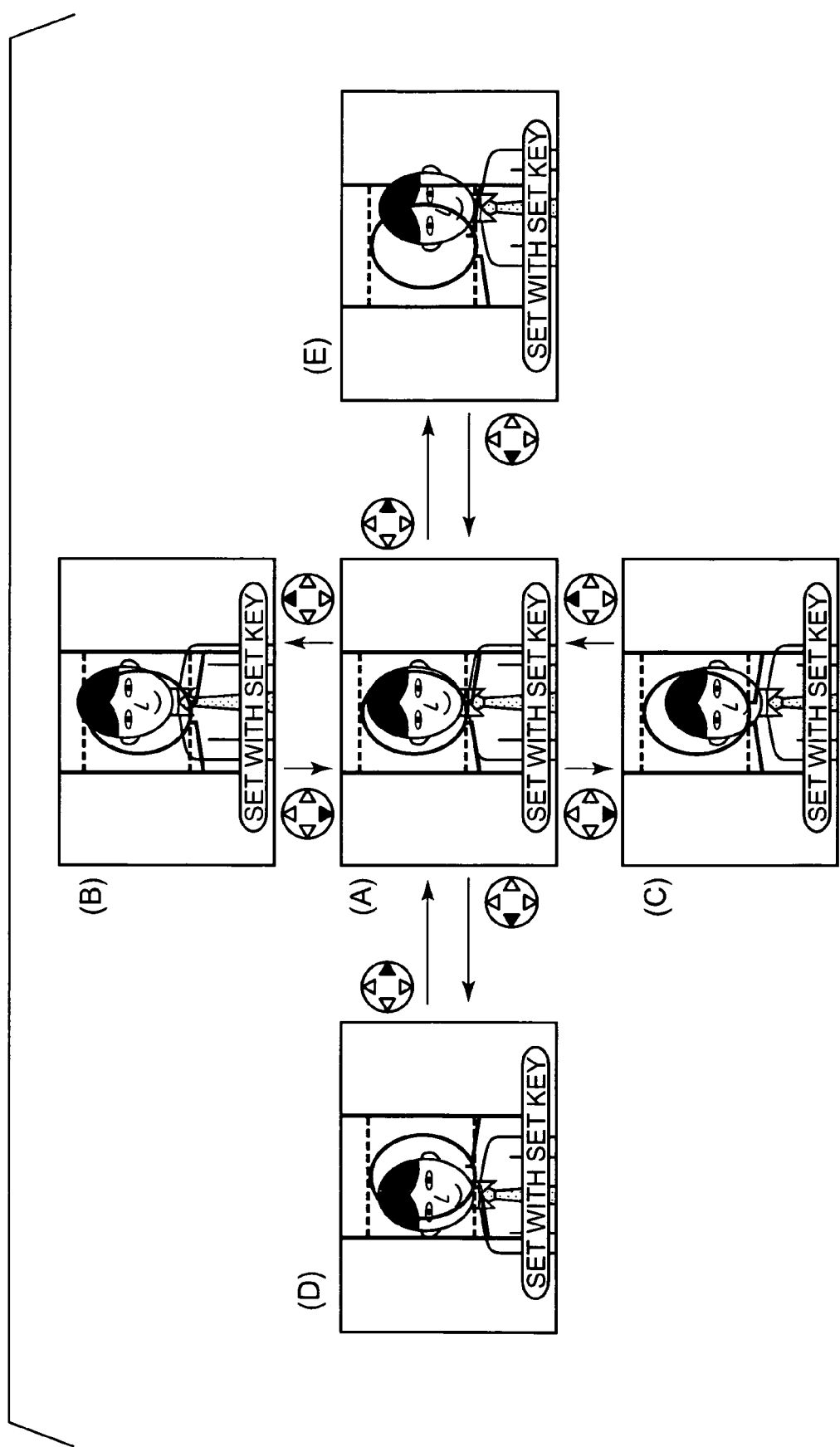
FIG. 5 is a view showing object images whose positions are adjusted or changed on the image display unit 12.

When the user operates the cross key "→" with the image displayed on the image display unit 12 as illustrated at (d) in FIG. 5, the image moves rightward to a position as illustrated at (a) in FIG. 5 and further to a position illustrated at (e) on the image display unit 12. On the contrary, when the user operates the cross key "←" with the image displayed on the image display unit 12 as illustrated at (e) in FIG. 5, the image moves leftward to a position as illustrated at (a) in FIG. 5 and further to a position illustrated at (d) on the image display unit 12.

As described above, since operation of the cross key moves the image to an arbitrary position on the image display unit, the user can move the image of photographed image data such that the object to be photographed for ID photograph matches with the second-frame 102.

When it is determined at step S11 that the operation has not been performed to shift the position of the image of photographed image data to be displayed on the image display unit 12, CPU 10 advances directly to step S13, where it is judged whether or not the user has operated SET key. The judgment is made depending on whether or an operation signal corresponding to operation of SET key has been sent from the key input unit 13.

When it is determined at step 13 that SET key has not yet been operated, CPU 10 returns to step S9. When it is determined at step 13 that SET key has been operated, CPU 10 advances to step S14, where data of ID photograph sizes corresponding to a display language which has been set to the digital camera apparatus 1 is obtained. Note that in a display language setting mode, the user is allowed to previously set one of plural languages to be displayed, including Japanese, English, French, German and the like.

In the present embodiment, it is assumed that "Japanese" language has been set to the digital camera apparatus 1 as a display language. Therefore, ID photograph sizes which are obtained for "Japanese" language are 50×40 mm, 45×35 mm, 40×30 mm, and 30×24 mm.

CPU 10 trims portions of the image defined by or sticking out the second-frame 102 in accordance with each of the obtained ID photograph sizes, and produces plural sorts of trimmed-image data on the basis of the photographed image data stored on the buffer memory at step S15. Since sizes of 50×40 mm, 45×35 mm, 40×30 mm, and 30×24 mm are obtained for ID photographs, images to be trimmed have the aspect ratios of 5:4, 9:7, 4:3, and 5:4, respectively. As a result, four sorts of trimmed-image data are produced.

The trimmed-mage data is not produced by trimming image data of the image within the second-frame 102, but is produced on the basis of ID photograph sizes, and therefore each object image of the trimmed image data is adjusted to roughly fall within the second-frame 102. In other words, the second-frame is used as a rough measurement of ID photograph.

Then, CPU 10 obtains layout information which is now set at step S16.

In a setting mode the user can previously set arbitrary layout information.

Then, CPU 10 reads out from the memory 9 a printing size corresponding to the preset display language at step S17. Since "Japanese" language has been set as the display language, the printing size of 150×100 mm is read out.

CPU 10 produces layout image data for one printing sheet on the basis of the obtained layout information, printing size, and plural sorts of produced trimmed-image data at step S18. CPU 10 produces the layout image data by performing a thinning process and pixel-interpolation process on the produced trimmed-image data. While the image of the produced layout image data is printed in the read out printing size, the thinning process and pixel-interpolation process are performed such that the object images of ID photographs (images of the trimmed-image data) shall match with ID photograph sizes obtained at step S12, respectively. In this case, since the obtained printing size is the post-card size, when the image of the produced layout image data is printed so as to meet the post card size, the plural sorts of trimmed-image data are subjected to the thinning process and pixel-interpolation process such that printed images of ID photographs shall satisfy the ruled sizes, such as 50×40 mm, 45×35 mm, 40×30 mm, and 30×24 mm, respectively.

Figure 6C:
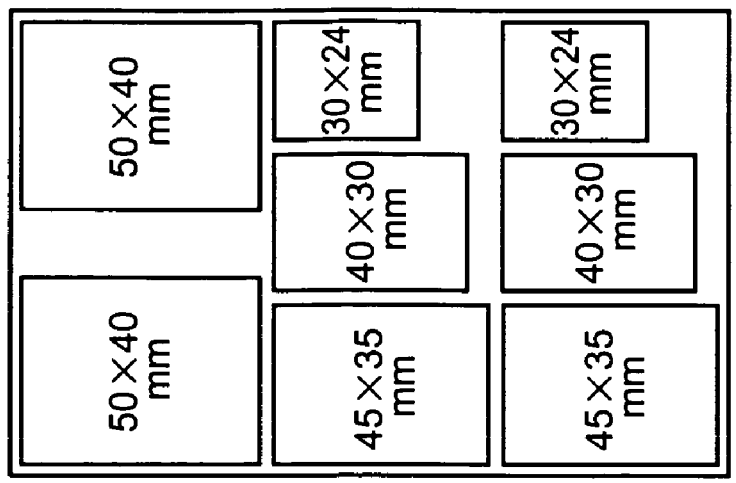
FIGS. 6A to 6C are views each showing a layout of object images of layout image data produced for the display language of "Japanese".
Figure 6B:
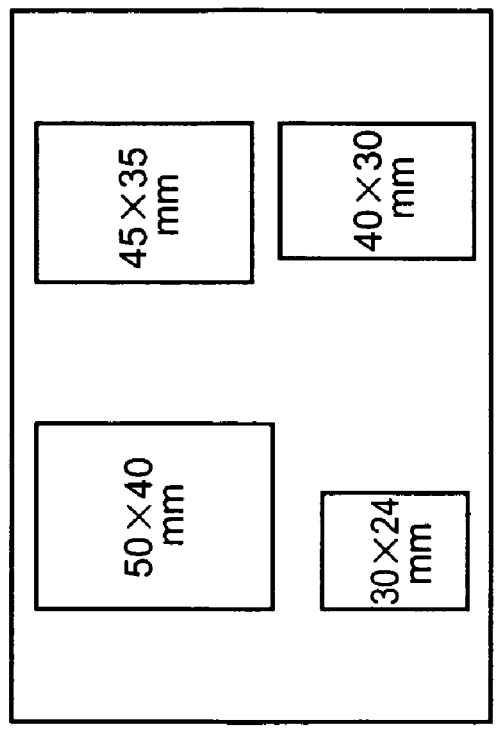
Figure 6A:
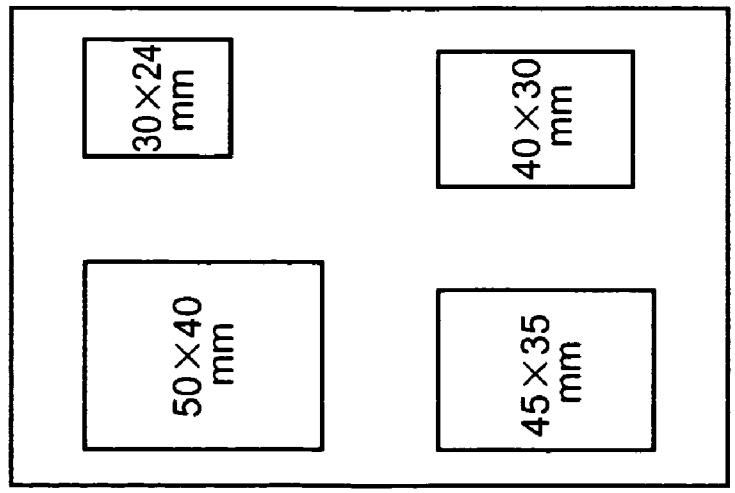

FIGS. 6A to 6C are views each illustrating an image of the produced layout image data to be printed for the display language of "Japanese", respectively.

FIG. 6A is a view illustrating the image of the produced layout image data to be printed, when the user has set the layout information 1. FIG. 6B is a view illustrating the image of the produced layout image data to be printed, when the user has set the layout information 2. FIG. 6C is a view illustrating the image of the produced layout image data to be printed, when the user has set the layout information 3.

Since it is assumed that the layout information 1 has been set, the printed image of the layout image data is given in FIG. 6A.

As described above, when the produced layout image data is printed in the post card size, the ID photographs are printed in the ID photograph sizes (50×40 mm, 45×35 mm, and so on) for the "Japanese" language. Therefore, if the layout image data is printed in A4 size or L size, the ID photographs could have been printed in sizes other than the ruled sizes.

FIGS. 6A to 6C (layouts 1 to 3) are views showing sizes of ID photographs for "Japanese" language. These views show examples for the layout of ID photographs to be printed. When a language other than "Japanese" language such as "English" has been set as the display language, the sizes of ID photograph are different from those displayed in FIGS. 6A to 6C.

Then, the produced layout image data is associated with the printing size obtained at step S15, and is recorded together with the associated printing size on the flash memory 11 or the memory card 18 at step S19.

Figure 7:
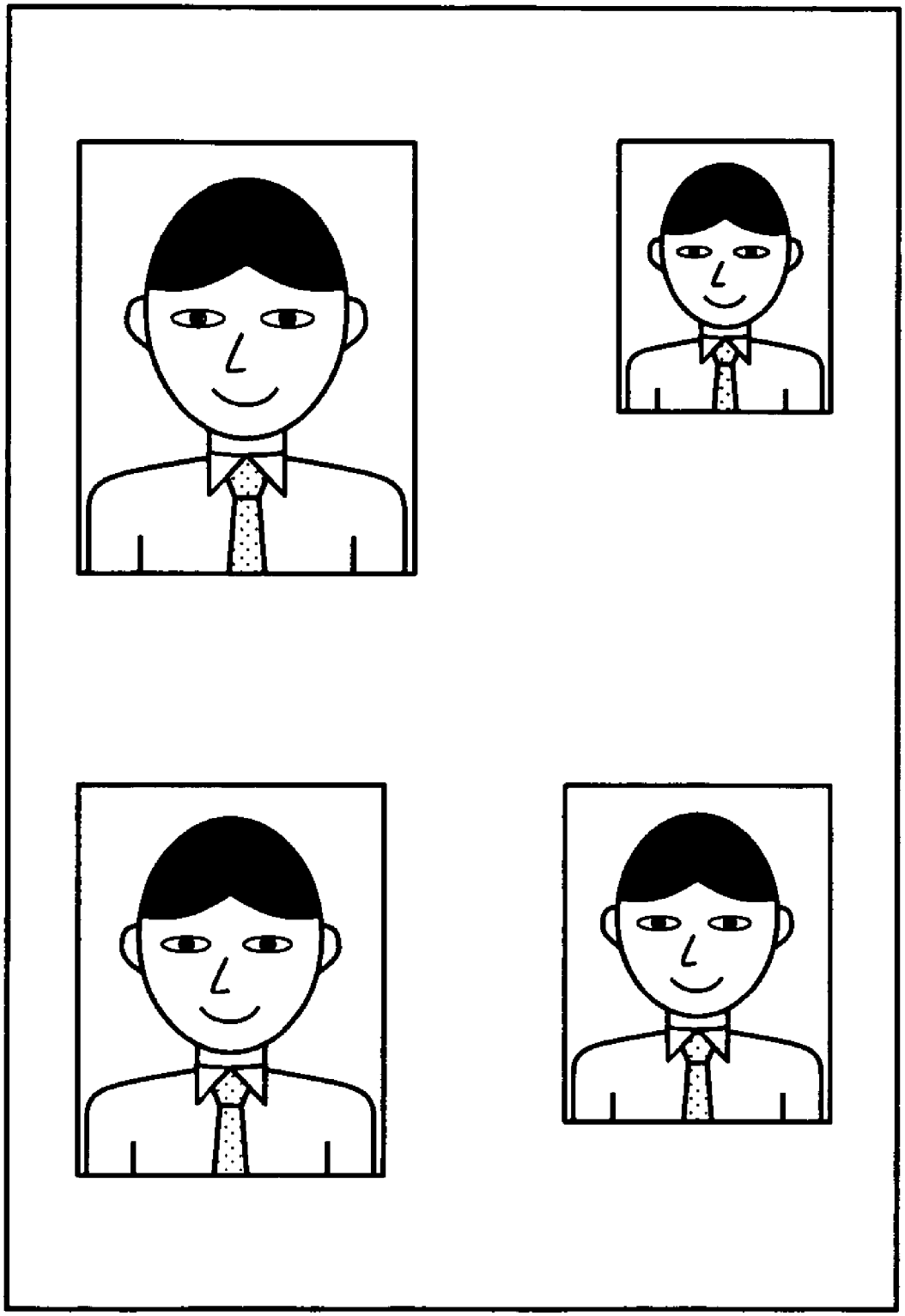
FIG. 7 is a view showing a layout of object images of the layout image data printed by a printer.

FIG. 7 is a view illustrating the object images of the recorded layout image data.

CPU 10 outputs the layout image data recorded on the flash memory 11 and information indicating a printing size to a printer connected to the digital camera apparatus 1. Upon receipt of the information indicating a printing size associated with the layout image data, the printer prints the received layout image data in the printing size (in this case, the post card size) specified by the information indicating a printing size.

Then, object images of the layout image data are printed as illustrated in FIG. 7. The layout image data is printed in the post card size, ID photographs of the object are printed in the sizes of 50×40 mm, 45×35 mm, 40×30 mm and 30×24 mm, respectively.

Modifications may be made to the first embodiment such that the printer itself reads out the layout image data directly from the memory card 18 for the printing purpose, or the printer is connected to the digital camera apparatus 1 through the communication unit to receive data directly from such apparatus 1, or the memory card 18 is taken off from the digital camera apparatus 1 and installed onto the printer to supply data thereto.

C. Advantages of the Digital Camera Apparatus 1

As described above, in the digital camera apparatus 1 according to the first embodiment of the invention, since the frame is displayed on the image display unit 12 with the through image displayed thereon and also the frame is displayed on the image display unit 12 while an image subjected to the photographing process to be photographed is displayed while the photographing operation is performed, the user can adjust the position of the object image to be photographed for ID photographs so as to meet the frame, and therefore can obtain ID photograph without failure.

Further, since plural sorts of trimmed-image data are produced for ID photograph, plural ID photographs are produced with one photographing operation.

Since sizes and aspect ratios of object images to be trimmed are adjusted with respect to the display language previously set in the digital camera apparatus 1, ID photographs can be obtained not only for the country of Japan but also for other country. Since sizes and aspect ratios of object images to be trimmed are adjusted with respect to the display language previously set in the digital camera apparatus 1, the user can obtain ID photographs automatically for the country where he or she lives without performing a selecting operation of country.

Second Embodiment

Now, a digital camera apparatus according to the second embodiment of the invention will be described in detail with reference to FIG. 8 and FIG. 9.

In the digital camera apparatus 1 according to the first embodiment of the invention, the image data generated immediately after the photographing operation is performed (that is, photographed image data stored on the buffer) is displayed together with the second-frame for producing ID photograph. Meanwhile, in a digital camera apparatus 2 according to the second embodiment of the invention, image data photographed and recorded in a photographing mode other than ID-photograph photographing mode is displayed together with second-frame for producing ID photograph.

D. Operation of Digital Camera Apparatus 2

The digital camera apparatus 2 according to the second embodiment of the invention has the same circuit configuration as the digital camera apparatus 1 shown in FIG. 1 but operates in a different way from the camera apparatus 1. Operation of the digital camera apparatus 2 according to the second embodiment of the invention will be described with reference to the flow chart shown in FIG. 8.

Figure 8:
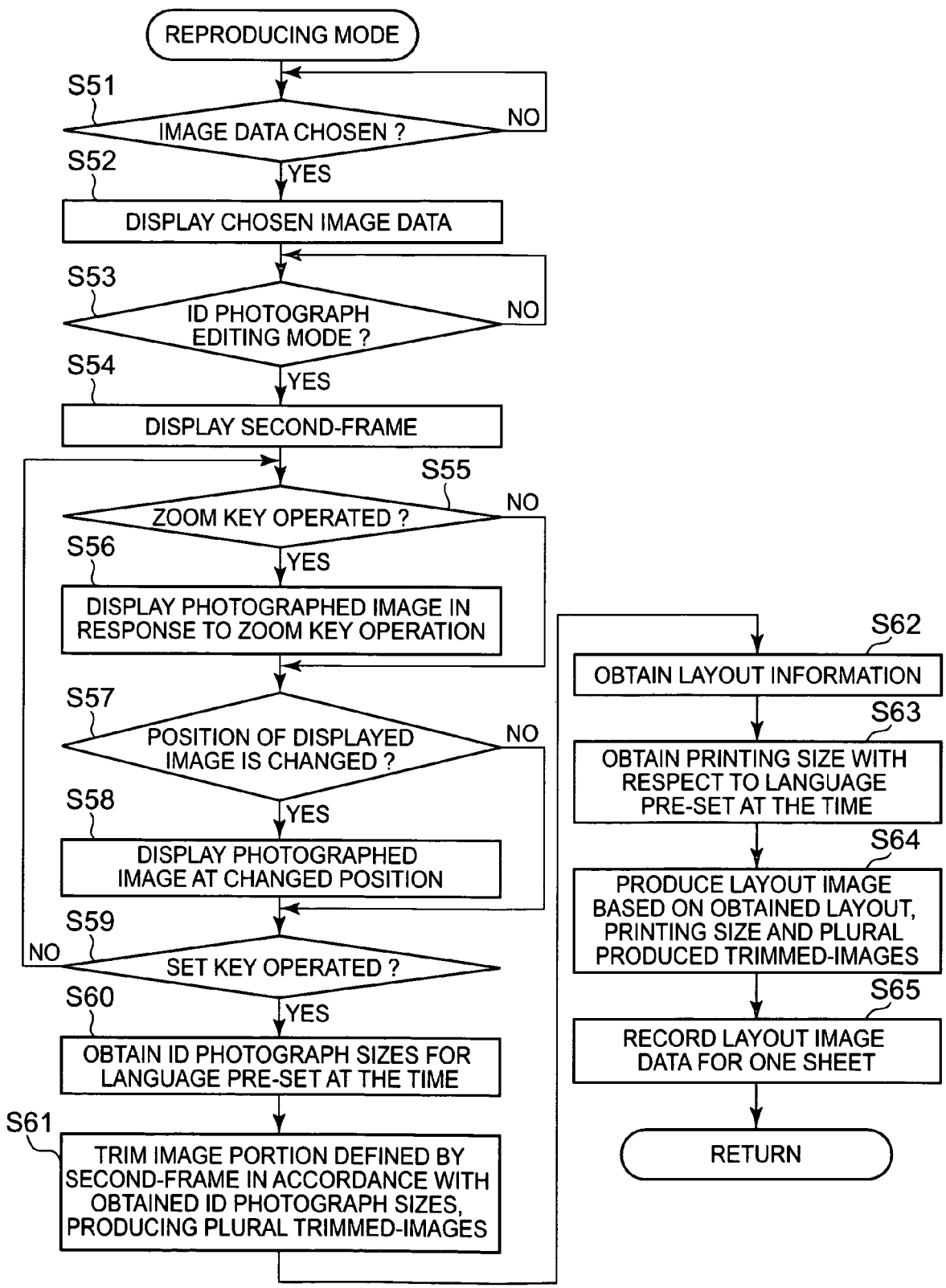
FIG. 8 is a flow chart of operation of digital camera apparatus according to the second embodiment of the invention.

When the user sets a reproducing mode by operating the key input unit 13, CPU 10 judges at step S51 in FIG. 8, whether or not any one of photographed image data has been chosen by the user among from those previously recorded on the flash memory 11 or memory card 18.

When it is determined at step S51 that no photographed image data is chosen by the user, CPU 10 repeatedly judges at step S51 whether or not any one of photographed image data has been chosen until either one is chosen among the photographed image data recorded on the flash memory 11 or memory card 18. When it is determined at step S51 that photographed image data has been chosen by the user, CPU 10 reads out the chosen photographed image data from the flash memory 11 and the like, and temporarily stores the read out photographed image data on the buffer memory and displays the recorded image data on the image display unit 12 at step S52.

Then, CPU 10 judges at step S53 whether or not ID-photograph editing mode has been selected by the user. This judgment is made based on whether or not an operation signal corresponding to operation for selecting ID photograph editing mode has been sent from the key input unit 13.

When it is determined at step S53 that ID photograph editing mode has not been selected by the user, CPU 10 repeatedly judges at step S53 whether or not ID photograph editing mode has been selected by the user until it is determined that ID photograph editing mode has been selected by the user. When it is determined at step S53 that ID photograph editing mode has been selected by the user, CPU 10 reads out the second-frame from the memory 9, and displays the read out second-frame on the image display unit 12 at step S54. In the second embodiment of the invention, the same frame as the second-frame that is used immediately after the photographing operation is performed in the first embodiment is displayed on the image display unit 12 as illustrated in FIG. 4B.

Further, CPU 10 judges at step S55 whether or not the user has operated the zoom key. When it is determined at step S55 that the zoom key has not yet been operated, CPU 10 advances to step S57. Meanwhile, when it is determined at step S55 that the zoom key has been operated, CPU 10 advances to step S56.

At step S56, in response to operation of the zoom key, (or in accordance with the operation signal sent from the key input unit 13), CPU 10 zooms in an image of photographed image data stored on the buffer memory in a digital manner, and then advances to step S57. For instance, when the user operates Tele key of the zoom key with an object image displayed with the frame as illustrated in FIG. 4A, an image as illustrated in FIG. 4C will be displayed on the image display unit 12.

At step S57, CPU 10 judges whether or not the user has shifted or changed a position of the image of the photographed image data displayed on the image display unit 12. This judgment is made depending on whether or not an operation signal corresponding to operation of the cross key has been sent from the key input unit 13. When it is determined at step S57 that operation has not yet been performed to shift or change the position of the image displayed on the image display unit 12, CPU 10 advances to step S59. When it is determined at step S57 that operation has been performed to shift or change the position of the image displayed on the image display unit 12, CPU 10 advances to step S58.

At step S58, CPU 10 changes or shifts a position of the image to be displayed in response to the user's operation of the cross key (or in accordance with the operation signal sent from the key input unit 13), and displays the image of the photographed image data stored on the buffer memory at the changed or shifted position, as in the same manner as the first embodiment. Then, CUP 10 advances to step S59.

CPU 10 judges at step S59 whether or not SET key has been operated.

When it is determined at step S59 that SET key has not yet been operated, then CPU 10 returns to step S55. Meanwhile, when it is determined at step S59 that SET key has been operated, CPU 10 reads out ID photograph sizes corresponding to the display language that has been set to the digital camera apparatus 2. Since it is assume that "Japanese" language has been set as the display language, ID photograph sizes are 50×40 mm, 45×35 mm, 40×30 mm, and 30×24 mm.

CPU 10 trims image data of image portion defined by the second-frame on the basis of the readout ID photograph sizes to produce plural trimmed-image data from photographed image data stored on the buffer memory at step S61.

Then, CPU 10 reads out the layout information that has been set to the apparatus 2 at step S62, and obtains from the memory 9 the printing size that has been set at step S63. In this case, it is assumed that the layout information 1 has been read out. Since "Japanese" language is set as the display language, a printing size of 150×100 mm is obtained.

CPU 10 produces layout image data for one printing sheet on the basis of the obtained layout information, printing size, and plural sorts of produced trimmed-image data at step S64. When the produced layout image data is printed in the read out printing size, CPU 10 performs the thinning process and pixel-interpolation process on the produced trimmed-image data such that ID photographs to be printed shall meet the obtained ID photograph sizes, respectively, thus obtaining layout image data for one sheet.

CPU 10 associates the produced layout image data with the printing size obtained at step S63 and stores same on the flash memory 11 or memory card 18 at step S65.

CPU 10 outputs the layout image data recorded on the flash memory 11 and information indicating a printing size to a printer connected to the digital camera apparatus 2. Upon receipt of the information indicating a printing size associated with the layout image data, the printer prints the received layout image data in the printing size (in this case, the post card size) defined by the information indicating a printing size.

Then, object images of the layout image data are printed as illustrated in FIG. 7. Since the layout image data is printed in the post card size, ID photographs of the object are printed in the sizes of 50×40 mm, 45×35 mm, 40×30 mm and 30×24 mm, respectively, that is, plural ID photographs are printed in the ruled sizes, respectively.

Modifications may be made to the second embodiment such that the printer reads out the layout image data directly from the memory card 18 for the printing purpose, or the printer is connected to the digital camera apparatus 2 through the communication unit to receive data directly from the apparatus 2, or the memory card 18 is taken off from the digital camera apparatus 2 and installed onto the printer to supply data thereto.

E. Advantages of the Second Embodiment

As described above, in the digital camera apparatus 2 according to the second embodiment, ID photograph can be obtained from image data previously stored therein.

Modifications of (1) to (8) can be made to the first and second embodiment of the invention as described below.

(1) In the above embodiments of the invention, the first-frame and second-frame are separately stored. When a through image is displayed, the first-frame is read out and displayed, and when previewing the object image, the second-frame is read out and displayed. Modification can be made such that the same frame is displayed both when a through image is displayed and when previewing the object image. More specifically, only one frame is stored, and the frame is read out and displayed when a through image is displayed and also when previewing the object image. In this case, the frame which is enlarged in size is displayed when a through image is displayed than that displayed when previewing the object image.

(2) In the above embodiments of the invention, the displayed image is increased or reduced in size and positions where the image is displayed are changed or shifted, such that the object image to be photographed for ID photograph is adjusted so as to fall within the predetermined frame. Modification can be made to these embodiments such that the frame is increased or reduced in size and the position of the frame is changed or shifted so as to make the object image fall within such frame. Further, modification can be made such that both the object image and the frame are increased or reduced in size, and positions of the object image and the frame are changed or shifted so as to make the object image fall within such frame.

(3) In the above embodiments of the invention, the layout image data for only one printing sheet is recorded. Modification can be made to the embodiments such that plural trimmed images (object images for ID photograph) produced at step S13 are recorded. In the modification, the trimmed images are recorded together with the information indicating a printing size, and the trimmed images are adjusted and recorded to be printed in the ruled sizes when data is printed in the size indicated by the information.

(4) In the above embodiments of the invention, plural trimmed images are produced, and the produced images are used to produce a layout image. But modification can be made to these embodiments such that only one trimmed image (ID photograph) is produced, and that either of ruled sizes defined for pre-set display language is selected or the trimmed images each defined for a display language are recorded.

(5) The above embodiments of the invention store the layout information 1 for displaying ID photographs each different in size on a landscape oriented sheet, the layout information 2 for displaying ID photographs each different in size on a portrait oriented sheet, and the layout information 3 for displaying 2 ID photographs having one size and another 2 ID photographs having another size on a landscape oriented sheet. Modification can be made to these embodiments such that plural sorts of layout information different with respect to each display language are stored. In the modification, ID photograph sizes are included in the layout information. For example, the layout information (including the size of ID photograph) for "English" language, the layout information (including the size of ID photograph) for "Japanese" language, the layout information (including the size of ID photograph) for "Japanese" language, the layout information (including the size of ID photograph) for "German" language are previously recorded, and layout information corresponding to the display language set at the time is read out.

Figure 9A:
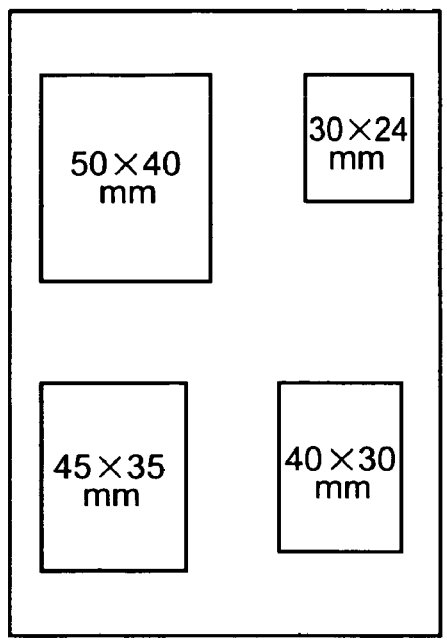
FIGS. 9A and 9B are views each showing a layout of object images specified by layout information for the display language of "Japanese".
Figure 9B:
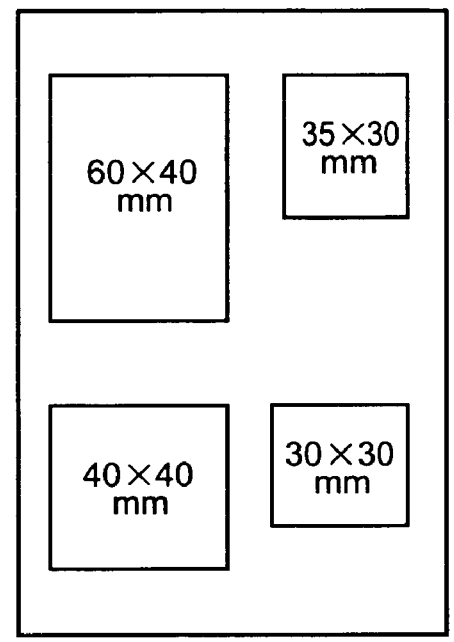

(6) Further, modification can be made such that plural sorts of information with respect to each language are recorded. In the modification, ID photograph sizes are included in the plural sorts of information. For example, with respect to "Japanese" language, two sorts of layout information each including plural sizes for ID photograph as illustrated in FIGS. 9A and 9B are recorded, and a layout image is produced based on the layout information chosen by the user, whereby the user is allowed to chose layout information including his or her desired size of ID photograph.

(7) In the above embodiments of the invention, the photographed image data obtained by the still image photographed process is displayed on the image display unit 12 for the reviewing purpose without any modification. Modification can be made to the above embodiments such that image data of an image is trimmed, which is displayed outside the range of the first-frame that is displayed together with a through image of the photographed image data on the image display unit 12, and the trimmed-image data is displayed on the image display unit 12 for a previewing purpose. The image data of the image displayed outside the first-frame does not constitute the essential portion of ID photograph.

(8) Two sorts of digital camera apparatus 1 and 2 according to the first and second embodiment of the invention are not limited to those described herein. A cellular phone with a camera, PDA with a camera, a personal computer with a camera, IC recorder with a camera, and a digital video camera can be used as the digital camera apparatus according to the embodiments of the invention. In short, any apparatus having a function of photographing an object can be used as the digital camera apparatus described herein.

What is claimed is:

1. An image pick-up apparatus comprising:
   an image display unit for displaying an image;
   an image pick-up unit for performing an image pick-up operation to generate an image of an object;
   a first display control unit for displaying on the image display unit a first frame together with a through image of the object generated by the image pick-up unit;
   a photography control unit for controlling the image pick-up operation to be performed by the image pick-up unit to obtain a photographed image of the object;
   a second display control unit for displaying on the image display unit one of the first frame and a second frame together with the photographed image of the object obtained by the photography control unit,
   a storing unit for storing an image;
   a trimmed image producing unit for trimming portions of the photographed image of the object defined by the frame displayed by the second display control unit, thereby producing a trimmed image from the photographed image of the object displayed on the image display unit;

a record control unit for recording on the storing unit the trimmed image produced by the trimmed image producing unit; and a display language obtaining unit for obtaining a display language which has been set to the image pick-up apparatus, wherein the trimmed image producing unit produces trimmed images each having one of an aspect ratio and size which is automatically determined according to the display language obtained by the display language obtaining unit.

2. The image pick-up apparatus according to claim 1, further comprising:

a frame adjusting unit for adjusting a frame of the photographed image of the object displayed on the image display unit by the second display control unit;

wherein the second display control unit displays on the image display unit the photographed image of the object in accordance with the frame adjusted by the frame adjusting unit.

3. The image pick-up apparatus according to claim 2, wherein:

the frame adjusting unit includes an electronic zoom unit for adjusting a zoom factor of an image in accordance with zooming operation by a user, and the second display control unit displays on the image display unit the photographed image of the object based on the zoom factor adjusted by the electronic zoom unit, when the electronic zoom unit has adjusted the zoom factor.

4. The image pick-up apparatus according to claim 2, wherein:

the frame adjusting unit includes a position adjusting unit for adjusting in response to operation by a user, a position on the image display unit where the second display control unit displays the photographed image of the object, and the second display control unit displays on the image display unit the photographed image of the object at the position adjusted by the position adjusting unit, when the position adjusting unit has adjusted the position where the photographed image of the object is to be displayed.

5. The image pick-up apparatus according to claim 1, further comprising:

a zoom adjusting unit for adjusting a zoom factor of the frame which the second display control unit displays on the image display unit;

wherein the second display control unit displays one of the first frame and the second frame on the image display unit based on the zoom factor adjusted by the zoom adjusting unit.

6. The image pick-up apparatus according to claim 1, further comprising:

a frame position adjusting unit for adjusting a position on the display unit where the second display control unit displays the frame, wherein the second display control unit displays the one of the first frame and the second frame at the position adjusted by the frame position adjusting unit.

7. The image pick-up apparatus according to claim 1, wherein the second display control unit displays on the image display unit a frame wider in size than the first frame displayed by the first display control unit.

8. The image pick-up apparatus according to claim 1, further comprising:

a frame storing unit for storing the first frame and the second frame;

wherein the first display control unit reads out the first frame from the frame storing unit and displays the read out first frame on the image display unit; and wherein the second display control unit reads out the second frame from the frame storing unit and displays the read out second frame on the image display unit.

9. The image pick-up apparatus according to claim 1, further comprising:

a storage control unit that trims portions of the photographed image of the object obtained by the photography control unit, which portions are displayed outside the first frame displayed by the first display control unit, thereby producing an initial trimmed image, and stores the produced initial trimmed image on the storing unit, wherein the second display control unit displays on the image display unit the initial trimmed image produced and stored on the storing unit by the storage control unit as the photographed image.

10. The image pick-up apparatus according to claim 1, wherein:

the trimmed image producing unit trims several times portions of the photographed image of the object defined by the frame displayed by the second display control unit, thereby producing plural trimmed images from the photographed image of the object displayed on the image display unit; and the record control unit records on the storing unit the plural trimmed images produced by the trimmed image producing unit.

11. The image pick-up apparatus according to claim 1, wherein the trimmed image producing unit produces plural trimmed images each having a different size from the photographed image of the object displayed on the image display unit.

12. The image pick-up apparatus according to claim 1, wherein the trimmed image producing unit produces plural trimmed images each having a different aspect ratio from the photographed image of the object displayed on the image display unit.

13. The image pick-up apparatus according to claim 1, further comprising:

a layout image producing unit for producing a sheet of layout image from the plural trimmed images produced by the trimmed image producing unit, wherein the record control unit records the sheet of layout image produced by the layout image producing unit on the storing unit.

14. The image pick-up apparatus according to claim 13, further comprising:

a selecting unit used by a user to select an arbitrary layout among plural layouts, wherein the layout image producing unit produces the sheet of layout image using the layout selected with selecting unit.

15. The image pick-up apparatus according to claim 1, wherein:

the trimmed image producing unit obtains a printing size corresponding to the display language obtained by the display language obtaining unit and produces trimmed images based on the obtained printing size, and the record control unit makes the trimmed images produced by the trimmed image producing unit associate with the printing size obtained by the trimmed image producing unit, and stores the trimmed images associated with the printing size on the storing unit.

16. The image pick-up apparatus according to claim 1, further comprising:

a photography instructing unit used by a user to instruct the image pick-up unit to photograph the object while the first display control unit displays on the image display unit the first frame together with the through image of the object obtained by the image pick-up unit, wherein the photography instructing unit controls the image pick-up operation of the image pick-up unit to obtain the photographed image of the object, when the photography instructing unit has given the instruction to the image pick-up unit to perform the image pick-up operation, and wherein the second display control unit displays on the image display unit the one of the first frame and the second frame together with the photographed image of the object obtained by the image pick-up unit, when the photography instructing unit has given the instruction to the image pick-up unit to perform the image pick-up operation.

17. An image pick-up apparatus comprising:

an image display unit for displaying an image;

an image data obtaining unit for obtaining image data;

a display control unit for displaying on the image display unit a frame together with the image data obtained by the image data obtaining unit;

a trimmed image producing unit for trimming at least a portion of an image of the image data defined by the frame displayed on the image display unit to produce trimmed image data from the image data obtained by the image data obtaining unit;

a recording unit for recording data;

a record control unit for recording the trimmed image data produced by the trimmed image producing unit on the recording unit;

a display language obtaining unit for obtaining a display language which has been set to the image pick-up apparatus; and an obtaining unit for automatically obtaining one of a size and aspect ratio of the image to be trimmed in accordance with the display language obtained by the display language obtaining unit, wherein the trimmed image producing unit trims at least the portion of the image of the image data obtained by the image data obtaining unit, which portion is defined by the frame displayed on the image display unit, based on the one of the size and aspect ratio obtained by the obtaining unit, thereby producing the trimmed image data from the image data obtained by the image data obtaining unit.

18. The image pick-up apparatus according to claim 17, further comprising:

a layout data producing unit for producing layout image data for one sheet from plural sorts of trimmed image data each having a different aspect ratio produced by the trimmed image producing unit, wherein the record control unit records on the recording unit the layout image data for one sheet produced by the layout data producing unit.

19. The image pick-up apparatus according to claim 17, further comprising:

an image pick-up unit for photographing an object to produce the image data, wherein the image data obtaining unit obtains the image data produced by the image pick-up unit.

20. The image pick-up apparatus according to claim 17, wherein the image data obtaining unit obtains the image data recorded on the recording unit.

21. A computer-readable storage medium having an image pick-up program stored thereon that is executable by an image pick-up apparatus to perform processes comprising:

performing an image pick-up operation to generate an image of an object;

displaying the image;

displaying a first frame together with a through image of the generated image of the object;

controlling the image pick-up operation to obtain a photographed image of the object;

displaying one of the first frame and a second frame together with the obtained photographed image of the object, storing an image;

trimming portions of the photographed image of the object defined by the displayed frame, thereby producing a trimmed image from the photographed image of the displayed object;

recording the trimmed image; and obtaining a set display language;

wherein the trimmed image has one of an aspect ratio and size which is automatically determined according to the obtained display language.

22. A computer-readable storage medium having an image pick-up program stored thereon that is executable by an image pick-up apparatus to perform processes comprising:

performing an image pick-up operation to obtain image data of an object;

displaying an image of the obtained image data;

displaying a frame together with the displayed image of the image data;

trimming at least a portion of the image of the image data defined by the displayed frame to produce trimmed image data from the image data;

recording the trimmed image data;

obtaining a display language set to the image pick-up apparatus; and automatically obtaining one of a size and aspect ratio of the image to be trimmed in accordance with the obtained display language, wherein at least the portion of the image of the image data, defined by the displayed frame, is trimmed based on the obtained one of the size and aspect ratio, whereby trimmed image data is produced from the image data.

* * * * *